(12) United States Patent
Hong et al.

(10) Patent No.: US 11,242,465 B2
(45) Date of Patent: Feb. 8, 2022

(54) AQUEOUS INKJET INK COMPOSITIONS

(71) Applicant: Sensient Imaging Technologies, St. Louis, MO (US)

(72) Inventors: Wenbin Hong, Ballwin, MO (US); Mihaela Madaras, Ballwin, MO (US); Peter John Lyon, St Sulpice (SE)

(73) Assignee: Sun Chemical Corporation, Parsippany, NJ (US)

( * ) Notice: Subject to any disclaimer, the term of this patent is extended or adjusted under 35 U.S.C. 154(b) by 193 days.

(21) Appl. No.: 16/341,713

(22) PCT Filed: Oct. 13, 2017

(86) PCT No.: PCT/US2017/056648
§ 371 (c)(1),
(2) Date: Apr. 12, 2019

(87) PCT Pub. No.: WO2018/071858
PCT Pub. Date: Apr. 19, 2018

(65) Prior Publication Data
US 2020/0040205 A1 Feb. 6, 2020

Related U.S. Application Data

(60) Provisional application No. 62/408,565, filed on Oct. 14, 2016.

(51) Int. Cl.
| | | |
|---|---|---|
| *C09D 11/102* | (2014.01) | |
| *C09D 11/00* | (2014.01) | |
| *C09D 175/04* | (2006.01) | |
| *B41J 2/175* | (2006.01) | |
| *C09D 11/322* | (2014.01) | |
| *C09D 11/328* | (2014.01) | |
| *C09D 11/38* | (2014.01) | |

(52) U.S. Cl.
CPC ......... *C09D 11/102* (2013.01); *B41J 2/17506* (2013.01); *C09D 11/00* (2013.01); *C09D 11/322* (2013.01); *C09D 11/328* (2013.01); *C09D 11/38* (2013.01); *C09D 175/04* (2013.01)

(58) Field of Classification Search
CPC ... C09D 11/102; C09D 11/322; C09D 11/328; C09D 11/38; B41J 2/17506
USPC ....................................................... 523/161
See application file for complete search history.

(56) References Cited

U.S. PATENT DOCUMENTS

| | | |
|---|---|---|
| 4,801,553 A | 1/1989 | Owen et al. |
| 4,861,826 A | 8/1989 | Hummerich et al. |
| 4,895,894 A | 1/1990 | Ruetman et al. |
| 5,116,409 A | 5/1992 | Moffatt |
| 5,334,690 A | 8/1994 | Schafheutle et al. |
| 5,802,818 A | 9/1998 | Doll et al. |
| 5,861,447 A | 1/1999 | Nagasawa et al. |
| 5,863,980 A | 1/1999 | Choi et al. |
| 5,997,622 A | 12/1999 | Weber et al. |
| 6,001,161 A | 12/1999 | Evans et al. |
| 6,089,703 A | 7/2000 | Pearson |
| 6,583,215 B2 | 6/2003 | Probst et al. |
| 6,642,303 B2 | 12/2003 | Schutze et al. |
| 6,784,243 B2 | 8/2004 | Rische et al. |
| H2113 H * | 1/2005 | Nichols |
| 6,849,111 B2 | 2/2005 | Suzuki et al. |
| 6,927,271 B2 | 8/2005 | Grandhee |
| 7,863,375 B2 | 1/2011 | Baghdachi et al. |
| 8,044,140 B2 | 10/2011 | Baghdachi et al. |
| 2003/0184629 A1 | 10/2003 | Valentini et al. |
| 2005/0172853 A1 | 8/2005 | Bruchmann et al. |
| 2008/0214729 A1 | 9/2008 | Buter et al. |
| 2010/0222448 A1 | 9/2010 | Ziegler et al. |
| 2011/0306724 A1 | 12/2011 | Campbell et al. |
| 2012/0183692 A1 | 7/2012 | Becker, IV |
| 2012/0223999 A1* | 9/2012 | Kraiter ............... C08G 18/0823 347/20 |
| 2014/0139595 A1* | 5/2014 | Hong ................... C09D 11/324 347/86 |

FOREIGN PATENT DOCUMENTS

| | | |
|---|---|---|
| EP | 1056814 B1 | 11/2004 |
| EP | 2254922 B1 | 8/2013 |
| WO | 2011069041 A1 | 6/2011 |
| WO | 2012009415 A2 | 1/2012 |
| WO | 2013169871 A1 | 11/2013 |

OTHER PUBLICATIONS

Alberdingk Boley (Product Information, DUR 95, 2011) (Year: 2011).*
United States Patent Office Action for U.S. Appl. No. 15/783,917 dated Aug. 2, 2019 (10 pages).
International Search Report and Written Opinion for Application No. PCT/US2017/056648 dated Jan. 4, 2018 (12 pages).
International Preliminary Report on Patentability for Application No. PCT/US2017/056648 dated Apr. 25, 2019 (7 pages).
United States Patent Office Action for U.S. Appl. No. 15/783,917 dated Feb. 13, 2020 (11 pages).

* cited by examiner

*Primary Examiner* — Doris L Lee

(74) *Attorney, Agent, or Firm* — Howard C. Lee

(57) ABSTRACT

Aqueous inkjet ink compositions, methods of preparing the inkjet ink compositions, inkjet ink cartridges containing the aqueous inkjet ink composition, methods of filling a print cartridge with the aqueous inkjet ink composition, and methods of printing an image on a substrate using the inkjet ink composition are disclosed.

23 Claims, No Drawings

AQUEOUS INKJET INK COMPOSITIONS

CROSS-REFERENCE TO RELATED APPLICATION

This patent application is the U.S. national stage entry, under 35 U.S.C. § 371, of International Application Number PCT/US2017/056648, filed Oct. 13, 2017, which claims the benefit of and priority to U.S. Provisional Application No. 62/408,565, filed Oct. 14, 2016, the content of which are hereby incorporated by reference herein in their entirety.

FIELD OF THE INVENTION

The present invention relates to aqueous inkjet ink compositions useful in inkjet printing, methods of preparing the compositions, inkjet cartridges containing the inkjet ink compositions, methods of filling the cartridges with the compositions, and methods of printing an image on a substrate using the inkjet ink compositions.

BACKGROUND OF THE INVENTION

Inkjet printers are well known. A common type of inkjet printing uses a set of print cartridges containing ink mounted on a carriage that are moved relative to the surface of a print substrate in response to electronic signals. An image is created by the ejection of fine drops of an ink formulation through a small nozzle of a printhead of the cartridge onto the print substrate, e.g., paper, transparent film polymeric sheet or textile material. Aqueous ink formulations are often used in inkjet printing. Aqueous inkjet ink compositions typically comprise water, colorants (e.g., dyes, pigments) and a binder resin, and can further include water-miscible organic co-solvents (humectants) and additives such as surfactants. Once deposited, the printed image dries by evaporation and absorption into the print substrate.

Inkjet formulations can exhibit problems due to poor dispersibility of the binder resin which leads to instability of the composition during storage. Another problem of inkjet inks is clogging of the print nozzle due, for example, to solvent evaporation resulting in an increase in the ink viscosity. Other problems of inks include poor print quality such as ink bleeding and feathering and smudging due to long drying times.

As inkjet printing continues to move toward higher speed printing, inkjet inks must be formulated with a high degree of storage stability and to meet the challenge of reliable jettability without clogging print nozzles. Another consideration of inkjet ink formulations is the delivery of good quality print images having, for example, edge sharpness, high image density, color bleed control, a quick dry time and strong adhesion to the print substrate.

SUMMARY OF THE INVENTION

In an embodiment, the invention provides an aqueous inkjet ink composition, comprising:
A. A water-dispersible polyurethane polymer having a backbone with pendant hydroxyl groups and, optionally, pendant neutralized carboxyl groups;
B. A colorant;
C. A fluid carrier; and
D. Optionally, a crosslinker.
In an embodiment, the fluid carrier comprises:
a) water;
b) one or more water-soluble organic co-solvents, water-miscible organic co-solvents, or a combination thereof.

In an embodiment, the aqueous inkjet ink composition further includes one or more additives, as for example but not limited to, preservatives, surfactants, pH modifiers, viscosity modifiers, humectants, penetrating agents, and additional polymers.

In another embodiment, the invention provides a method of preparing the aqueous inkjet ink composition, comprising mixing together the water-dispersible polyurethane polymer, colorant and fluid carrier to form the inkjet ink composition, optionally with a crosslinking agent, and optionally with one or more additives.

In another embodiment, the invention provides an inkjet ink cartridge comprising a container, and an inkjet ink composition according to the disclosure contained in the container.

In another embodiment, the invention provides a method of filling an inkjet ink cartridge, comprising:
conducting an inkjet ink composition according to the disclosure through an opening of a housing of the cartridge to an internal reservoir within the housing;
filling the internal reservoir with the composition; and
sealing the opening of the housing.

In another embodiment, the invention provides a method of printing on a print substrate, comprising using an inkjet print-head to deposit an inkjet ink composition as disclosed herein on the print substrate to form an image thereon. In embodiments, the print substrate can be plastic, glass, metal, paper, a textile, among others.

DETAILED DESCRIPTION OF THE PREFERRED EMBODIMENT

Embodiments of the invention generally include aqueous inkjet ink compositions, methods of preparing the inkjet ink composition, inkjet ink cartridges containing the aqueous inkjet ink composition, methods of filling a print cartridge with the aqueous inkjet ink composition, and methods of printing an image on a substrate using the inkjet ink composition.

In embodiments, the invention provides an aqueous inkjet ink composition comprising a water-dispersible polyurethane polymer having a backbone with pendant hydroxyl groups and optionally pendant neutralized carboxyl groups, a colorant, a fluid carrier, optional additives, and optionally a crosslinking agent. In embodiments, the crosslinking agent is capable of crosslinking with the hydroxyl group.

In embodiments, the aqueous inkjet ink composition comprises a water-dispersible polyurethane polymer having a backbone with pendant neutralized carboxyl group(s) and pendant hydroxyl groups, a colorant, a fluid carrier, and optional additives. In embodiments, the composition includes a crosslinking agent. In embodiments, the crosslinking agent is capable of crosslinking with the carboxyl group.

In embodiments, the fluid carrier comprises water and one or more organic co-solvents. In embodiments, the organic solvents can be water soluble, water miscible, or a mixture of both.

All percents are by weight based on the total weight of the inkjet ink composition unless otherwise indicated.

Unless otherwise indicated, all numbers expressing quantities of ingredients, properties such as reaction conditions, and so forth as used in the specification and claims are to be understood as being modified in all instances by the term "about."

Water-Dispersible Polyurethane Polymer

In embodiments, the water-dispersible polyurethane polymer is a polyurethane polymer having pendant hydroxyl groups and, optionally, pendant neutralized carboxyl groups attached to the backbone of the polymer.

In embodiments, the water-dispersible polyurethane polymer is a polyurethane polymer having pendant neutralized carboxyl groups and pendant hydroxyl groups attached to the backbone of the polymer.

The term "pendant group" as used herein describes a side group of a polymer main chain (backbone). The term "terminal group" describes a group attached to a terminal end of the polymer main chain.

In embodiments, the polyurethane polymer has a carboxyl number of zero (0). In other embodiments, the polyurethane polymer has a carboxyl number of at least 1, such as at least 5, and at least 10. In embodiments, the carboxyl number of the polyurethane polymer is 500 or less, such as 400 or less, 300 or less, 200 or less, and 100 or less. In embodiments, the hydroxyl number of the polyurethane polymer is at least 51, such as at least 60, at least 70, and at least 80. In embodiments, the hydroxyl number of the polyurethane polymer is 1000 or less, such as 750 or less, 500 or less, 250 or less, 200 or less, 150 or less, and 100 or less. This includes embodiments in which the polyurethane polymer has a carboxyl number of from 0 to 500, such as from 1 to 500, from 5 to 200, and from 10 to 100, and a hydroxyl number of from 51 to 1000, such as from 51 to 300, from 80 to 200, and from 80 to 100.

The polyurethanes can be produced by methods known and used in the art. In general, the polyurethane polymer can be produced by reaction of an isocyanate compound with a polyol, an ionic polyol, or a combination thereof, in the presence of a catalyst.

Examples of isocyanate compounds are well known in the art and include, for example, but are not limited to, 1,6-hexamethylene diisocyanate (HDI), isophorone diisocyanate, methylene diphenyl diisocayante (MDI), and toluene diisocyanate (TDI), among others.

Examples of suitable polyols include diols, triols, tetraols, pentaols and oligomers having pendant or terminal hydroxyl groups. Examples of diols include, but are not limited to, ethylene glycol, propylene glycol, 1,3-propanediol, 1,4-butylene glycol, 1,5-pentanediol, 1,6-hexandiol, neopentyl glycol, diethylene glycol, triethylene glycol, and dipropylene glycol. Examples of triols include, but are not limited to, glycerol and trimethylolpropane. Examples of tetraols include, but are not limited to, tetramethylolmethane (pentaerythritol) and diglycerol. Examples of pentaols include, but are not limited to, xylitol. Examples of oligomers having pendant or terminal hydroxyl groups include, but are not limited to, polyether polyols such as polypropylene glycol, polyester polyols, polycarbonate polyols, and polyolefin polyols such as polybutadiene polyol.

In embodiments, the ionic polyol is a diol, triol, tetraol or pentaol with one or more carboxyl groups, or an oligomer having hydroxyl and carboxyl groups. In embodiments, the ionic polyol is a dihydroxylcarboxylic acid such as 2,2-di(hydroxymethyl)acetic acid, dimethylolpropionic acid (DMPA), 2,2-bis(hydroxymethyl) butyric acid, or 2,2-di(hydroxymethyl)pentanoic acid. By "ionic polymer," it is meant that the polymer that contains an ionic functional group.

In embodiments, the pendant group is a side group of polymers without a linear chain structure that extend from and are attached to the main chain, for example, branched, hyper-branched, star, and dendritic polymer groups. By "branched polymer" it is meant that the polymer has secondary polymer chains branching off a main chain. By "hyperbranched" polymer, it is meant that the polymer that is highly and densely branched polymer with an irregular branched structure, and include polymers having a regular branched structure that are referred to as "dendrimers." By dendrimer or "dendritic" polymer, it is meant that the polymer resembles a tree-like structure with densely branched structures that typically consists of a core from which branches extend and with a large number of end groups. A "star" polymer refers to a branched polymer in which a single branch has multiple linear chains or arms radiating outward.

Branched polyurethanes can be produced, for example, by reacting a diisocyanate with excess amounts of triols, pentaols and other multifunctional polyols (e.g., having a hydroxyl functionality of greater than 2), and their mixtures with diols, and/or with ionic polyols. Methods for producing branched polyurethanes are known in the art, as described, for example, in U.S. Pat. Nos. 4,801,553, 4,895,894, 5,863,980, US 2010/0222448, U.S. Pat. Nos. 4,861,826, 5,334,690, 6,583,215, 6,642,303, 6,784,243 and US 2011/0306724.

Hyperbranched, star and dendritic polyurethanes with pendant carboxyl and hydroxyl groups can be prepared, for example, by step-growth polymerization of triisocyanates with multifunctional polyols and ionic polyols. Methods for producing hyperbranched polyurethanes are known in the art, as described, for example, in U.S. Pat. Nos. 6,927,271, 7,863,375, 8,044,140 and US 2012/0183692.

Examples of commercially available polyurethane polymers include, but are not limited to, Hauthane® (available from Hauthaway Corporation), Aquence® (available from Henkel Corporation), and Alberdingk® (available from Alberdingk Boley Inc.).

In one embodiment, the water-dispersible polyurethane polymer includes one or more pendant carboxyl groups, and will undergo an optional crosslinking reaction through the reaction of the pendant carboxyl groups with a cross-linking agent. To prevent a pre-mature crosslinking reaction from occurring upon mixing the components of an inkjet ink composition which includes a polyurethane polymer having pendant carboxyl group(s) and a crosslinking agent (and thus stabilize the ink composition during a storage period and prior to use), the carboxyl groups of the polyurethane polymer can be neutralized.

To neutralize the carboxyl groups, the polyurethane polymer can be reacted with a neutralizing agent (e.g., a base) to form a carboxylate salt. A neutralizing agent can be used alone or in combination of two or more kinds. The neutralizing agent as used herein is capable of being disengaged from the carboxyl group and, in embodiments, removed from the ink composition at the desired time to allow the crosslinking reaction to proceed. Examples of suitable neutralizing agents include, but are not limited to, ammonia and tertiary amines.

In embodiments, the neutralizing agent is ammonia such that neutralized carboxyl groups are in the form of an ammonium carboxylate salt. An ammonia neutralizing agent can be disengaged from the carboxyl group and removed from the ink composition, for example, by evaporation upon exposure of the composition to atmospheric conditions with or without the application of heat, to allow the crosslinking reaction to proceed.

In embodiments, the neutralizing agent is a tertiary amine such that neutralized carboxyl groups are in the form of a tertiary amine carboxylate salt. Any tertiary amine can be used as a neutralizing agent as long as the tertiary amine can be disengaged from the carboxyl group and removed from the ink composition, to allow the crosslinking reaction to proceed, for example, by evaporation from the composition upon exposure to atmospheric conditions with or without the application of heat. Nonlimiting examples of tertiary amines include triethylamine (TEA), 2-dimethylaminoethanol (DMEA), triethanolamine (TEA-OH), trimethylamine, dimethylethylamine (DMEA), diethylmethylamine (DEMA), dimethyl-isopropylamine (DMIPA), dimethyl-n-propylamine (DMPA), N-methylpyrrolidine, N,N-diisopropylethanolamine, N,N-diisopropylethylamine, N,N-diethylethanolamine, N-tributylamine, N-butyl-N-ethyl-N-methylamine, N-isopentyldimethylamine, N,N-diethylmethylamine, N-amyldimethylamine, N-methylmorpholine, N,N-dimethylcyclohexylamine, N,N-dimethylisobutylamine, N,N-dimethyl-2-(2-aminoethoxy-ethanol), N-methyldiethanolamine, N,N-dimethylbenzylamine, tri-n-butylamine, among others.

In another embodiment, the water-dispersible polyurethane polymer includes one or more pendant carboxyl groups that can be neutralized by reaction with an alkali metal hydroxide, such that neutralized carboxyl groups are in the form of an alkali metal (e.g., sodium, lithium, potassium) carboxylate salt. Examples of alkali metal hydroxides include, but are not limited to, lithium hydroxide, potassium hydroxide and sodium hydroxide. In embodiments, the polyurethane polymer can undergo an optional crosslinking reaction through the reaction of the pendant hydroxyl groups with a cross-linking agent such as an isocyanate. To prevent a pre-mature crosslinking reaction from occurring upon mixing the components of an inkjet ink composition which includes a polyurethane polymer having pendant hydroxyl group and a crosslinking agent (e.g., an isocyanate) capable of crosslinking with hydroxyl groups (and thus stabilize the ink composition during a storage period and prior to use), a blocked isocyanate, can be used. Examples of blocked isocyanates are known in the art and include, but are not limited to s-caprolactam blocked isocyanate, methyl ethyl ketoxime blocked isocyanate, 3,5-dimethyl pyrazole blocked isocyanate, diethyl malonate blocked isocyanate, phenol blocked isocyanate, alcohol blocked isocyanate, uretdione blocked isocyanate, acetanilide blocked isocyanate, and polymer blocked isocyanate. The crosslinking reaction can proceed when the blocking agent of the isocyanate compound (crosslinker) is removed, for example, at an elevated temperature.

In embodiments, the polyurethane polymer has a glass transition temperature ($T_g$) of at least −50° C., and preferably at least 0° C. In embodiments, the $T_g$ of the polyurethane polymer is at most 120° C., and preferably at most 50° C. In embodiments, the $T_g$ of the polyurethane polymer is −50° C. to 120° C., and preferably 0° C. to 50° C.

In embodiments, the polyurethane polymer has a number average molecular weight (Mn) of at least 1,000, and preferably at least 2,000. In embodiments, the Mn of the polyurethane polymer is at most 1,000,000, and preferably at most 50,000. In embodiments, the Mn of the polyurethane polymer is 1,000 to 1,000,000, and preferably 2,000 to 50,000.

In embodiments, the amount (by weight) of the water-dispersible polyurethane polymer having pendant hydroxyl groups and optional pendant neutralized carboxyl group(s) and in the inkjet ink composition is at least 0.1, such as at least 0.5, at least 1, at least 1.5, at least 2, at least 2.5, and at least 3, % by weight. In embodiments, the amount of the polyurethane polymer is at most 20, such as at most 18, at most 16, at most 14, at most 12, and at most 10, % by weight. This includes embodiments in which the amount of the polyurethane polymer in the inkjet ink composition is 0.1 to 20% by weight, such as 3 to 10% by weight.

A polyurethane polymer used in the inventive inkjet ink composition can comprise one or more embodiments described herein.

Colorant

Suitable colorants that can be used in the aqueous inkjet ink composition of the invention include dyes and pigment dispersions.

Dyes suitable for use in the inkjet ink compositions include, but are not limited to, those commonly used in the art of inkjet printing. Such dyes include, but are not limited to, water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Examples of suitable dyes include, but are not limited to, Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, and Food Black, among others.

Specific examples of dyes usable in the present invention are as follows: yellow dyes including: C.I. Acid Yellow 1, 3, 11, 17, 19, 23, 25, 29, 36, 38, 40, 42, 44, 49, 59, 61, 70, 72, 75, 76, 78, 79, 98, 99, 110, 111, 127, 131, 135, 142, 162, 164, and 165; C.I. Direct Yellow 1, 8, 11, 12, 24, 26, 27, 33, 39, 44, 50, 58, 85, 86, 87, 88, 89, 98, 110, 132, 142, and 144; C.I. Reactive Yellow 1, 2, 3, 4, 6, 7, 11, 12, 13, 14, 15, 16, 17, 18, 22, 23, 24, 25, 26, 27, 37, and 42; and C.I. Food Yellow 3 and 4; magenta dyes including: C.I. Acid Red 1, 6, 8, 9, 13, 14, 18, 26, 27, 32, 35, 37, 42, 51, 52, 57, 75, 77, 80, 82, 85, 87, 88, 89, 92, 94, 97, 106, 111, 114, 115, 117, 118, 119, 129, 130, 131, 133, 134, 138, 143, 145, 154, 155, 158, 168, 180, 183, 184, 186, 194, 198, 209, 211, 215, 219, 249, 252, 254, 262, 265, 274, 282, 289, 303, 317, 320, 321, and 322; C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230, and 231; C.I. Reactive Red 1, 2, 3, 4, 5, 6, 7, 8, 11, 12, 13, 15, 16, 17, 19, 20, 21, 22, 23, 24, 28, 29, 31, 32, 33, 34, 35, 36, 37, 38, 39, 40, 41, 42, 43, 45, 46, 49, 50, 58, 59, 63, and 64; and C.I. Food Red 7, 9, and 14; cyan dyes including: C.I. Acid Blue 1, 7, 9, 15, 22, 23, 25, 27, 29, 40, 41, 43, 45, 54, 59, 60, 62, 72, 74, 78, 80, 82, 83, 90, 92, 93, 100, 102, 103, 104, 112, 113, 117, 120, 126, 127, 129, 130, 131, 138, 140, 142, 143, 151, 154, 158, 161, 166, 167, 168, 170, 171, 182, 183, 184, 187, 192, 199, 203, 204, 205, 229, 234, 236, and 249; C.I. Direct Blue 1, 2, 6, 15, 22, 25, 41, 71, 76, 77, 78, 80, 86, 87, 90, 98, 106, 108, 120, 123, 158, 160, 163, 165, 168, 192, 193, 194, 195, 196, 199, 200, 201, 202, 203, 207, 225, 226, 236, 237, 246, 248, and 249; C.I. Reactive Blue 1, 2, 3, 4, 5, 7, 8, 9, 13, 14, 15, 17, 18, 19, 20, 21, 25, 26, 27, 28, 29, 31, 32, 33, 34, 37, 38, 39, 40, 41, 43, 44, and 46; and C. I. Food Blue 1 and 2; black dyes including: C.I. Acid Black 1, 2, 7, 24, 26, 29, 31, 48, 50, 51, 52, 58, 60, 62, 63, 64, 67, 72, 76, 77, 94, 107, 108, 109, 110, 112, 115, 118, 119, 121, 122, 131, 132, 139, 140, 155, 156, 157, 158, 159, and 191; C.I. Direct Black 17, 19, 22, 32, 39, 51, 56, 62, 71, 74, 75, 77, 94, 105, 106, 107, 108, 112, 113, 117, 118, 132, 133, 146, 154, and 168; C.I. Reactive Black 1, 3, 4, 5, 6, 8, 9, 10, 12, 13, 14, 31, and 18; and C.I. Food Black 2, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; the metal azo dyes disclosed in U.S. Pat. Nos.

5,997,622 and 6,001,161. Dyes for use in inkjet inks are well known in the art and are commercially available from sources such as BASF, CIBA, and Sensient.

Pigments refer to a colorant particle that is typically water-insoluble. Suitable pigments that can be used to form the inkjet ink compositions disclosed herein may include any organic or inorganic pigment known in the art, including, but not limited to, black, yellow, orange, brown, red, violet, blue, green, fluorescent, metal powder and polymer bond pigments. Pigments also may include, but are not limited to, carbon black, azo pigments, phthalocyanine pigments, anthraquinone pigments, perylene and perynone pigments, polycyclic pigments, naphthol pigments, anthrapyrimidone pigments, quinacridone pigments, anthanthrone pigments, flavanthrone pigments, thioindigo pigments, dioxazine pigments, isoindoline and isoindolinone pigments, quinophthalone pigments, azine pigments, nitroso pigments, nitro pigments, triphenylmethane lake pigments, oxazine lake pigments, metal complex pigments, natural pigments, and inorganic pigments, among others. The pigment particles should be sufficiently small to permit free flow of the ink through the ejecting nozzle of a inkjet printing device.

Suitable colored pigments can include, for example, yellow pigments such as C. I. Pigment Yellow 1, 2, 3, 4, 5, 6, 10, 12, 13, 14, 16, 17, 24, 55, 61, 65, 73, 74, 81, 83, 93, 94, 95, 97, 99, 100, 108, 109, 110, 117, 120, 123, 124, 128, 129, 133, 138, 139, 147, 150, 151, 153, 154, 155, 156, 167, 168, 172, 173, 174, 175, 176, 177, 179, 180, 181, 182, 183, 184, 185, 187, 188, 190, 191, 192, 193, and 194 among others; red pigments such as, C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48, 49, 50, 51, 52, 53, 55, 60, 64, 68, 81, 83, 87, 88, 89, 90, 95, 112, 114, 119, 122, 123, 136, 144, 146, 147, 148, 149, 150, 151, 163, 164, 166, 168, 169, 170, 161, 172, 175, 176, 202, 204, 206, 207, 210, 211, 212, 213, 214, 216, 220, 222, 237, 238, 239, 240, 242, 243, 245, 247, 248, 251, 252, 253, 254, 255, 256, 258, 261, and 264 among others; violet pigments such as C. I. Pigment Violet 1, 2, 3, 5, 13, 19, 23, 25, 27, 29, 31, 32, 37, 39, 42, 44, and 50 among others; blue pigments such as C. I. Pigment Blue 1, 2, 3, 9, 10, 14, 15, 16, 18, 19, 21, 22, 24, 25, 56, 60, 61, 62, 63, 64, 65, and 66, among others; orange pigments such as C. I. Pigment Orange 1, 2, 5, 6, 7, 13, 14, 15, 16, 17, 19, 22, 24, 31, 34, 36, 38, 40, 42, 43, 44, 46, 48, 49, 51, 59, 60, 61, 62, 63, 64, 65, 66, 67, 68, and 69 among others; green pigments such as C. I. Pigment Green 1, 2, 4, 7, 8, 10, 34, 36, 45, and 47, among others; brown pigments such as C. I. Pigment Brown 1, 2, 3, 5, 22, 23, 25, 26, 32, 38, 41, and 42 among others; black pigments such as C. I. Pigment Black 1, 7, 20, 31, and 32 among others, and white pigments such as titanium dioxide. Commercially available colored pigments may include, for example, Pigment Red 122 and Pigment Violet 19 (available from Lansco Colors, Montvale, N.J. or BASF Color, Charlotte, N.C. or Clariant Colors, Charlotte, N.C. or Sun Chemical, Cincinnati, Ohio), Pigment Blue 15:1 (available from Fanwood Chemical, Fanwood, N.J.), Pigment Blue 15:3, Pigment 15:4, Pigment Yellow 74 and Pigment Yellow 97 (available from BASF Color, Charlotte, N.C. or Clariant Colors, Charlotte, N.C. or Sun Chemical, Cincinnati, Ohio), among others. Other suitable pigments may include, but are not limited to Disperse Blue 14, Disperse Blue 19, Disperse Blue 72, Disperse Blue 334, Disperse Blue 359, Disperse Blue 360, Disperse Orange 25, Disperse Yellow 54, Disperse Yellow 64, Disperse Red 55, Disperse Red 60, Macrolex Red H, Disperse Brown 27, Solvent Blue 67, Solvent Blue 70, Solvent Red 49, Solvent Red 146, Solvent Red 160, Solvent Yellow 162, Solvent Violet 10, and Solvent Black 29, among others.

Suitable pigments can also include carbon black, which is the generic name for carbon particles derived from the thermal decomposition or the incomplete combustion of natural gas and hydrocarbons, such as aromatic oils on coal tar basis, mineral oils, coal tar distillate, and acetylene. More than 100 individual grades of carbon black are available on the market today, each with its own distinctive set of characteristics and properties. Any acidic carbon black, neutral carbon black and alkaline carbon black can be used. This includes channel blacks, gas blacks, lamp blacks, thermal blacks, acetylene blacks and furnace blacks. More particularly, suitable carbon blacks include channel blacks. Examples of commercially available carbon blacks include, but are not limited to, those available from Cabot (Elftex 8, Black Pearls® 490, Black Pearls® 120, Monarch® 120, Monarch® 700, Monarch® 880, Monarch® 1000, Monarch® 1100, Monarch® 1300, Monarch® 1400, Mogul® L, Regal® 99R, Regal® 250R, Regal® 300R, Regal® 330R, Regal® 400R, Regal® 500R, Regal® 660R, Cab-O-Jet® 200, Cab-O-Jet® 300, and Cab-O-Jet® 400), Degussa/Orion Carbon (NIPex® 150IQ, NIPex® 150, Printex® 55, Printex® 80, Printex® 90, Printex® A, Printex® G, Printex® U, Printex® V, Printex® 140U, Printex® 140V, Purex® LS 35, Corax® HP 160, Thermal Black N 990, NIPex® 160 IQ, Nipex® 170IQ, Nipex® 180IQ, NIPex® 90, Special black 4, Special black 4A, Special black 5, Special black 6, Special black 100, Special black 250, Color black FW1, Color black FW2, Color black FW2V, Color black FW18, Color black FW200, Color black S150, Color black S160 and Color black S170), Columbian/Birla Carbon (Raven® 780, Raven® 5000 UII, Raven® 1255, Raven® 2500 U, Raven®3600 U, Raven® 3500, Raven® 5000, Raven® 7000, Raven® 1220 and Raven® 1225), Mitsubishi Kagaku K.K. (MA8, MA11, MA77, MA100, MA220, MA230, MA600, MCF88, #10B, #20B, #30, #33, #40, #44, #45, #45L, #50, #55, #95, #260, #900, #970, #1000, #2200B, #2300, #2350, #2400B, #2650, #2700, #4000B and CF9), Orient Chemical Industries Ltd. (Bonjet Black CW-1, Bonjet Black CW-2, and Bonjet Black CW-3) and Sensient Technologies (Sensijet® Black SDP100, Sensijet® Black SDP1000, and Sensijet® Black SDP2000).

In some embodiments, the pigment can be self-dispersing in a selected continuous phase. Self-dispersing pigments are pigments that do not require an additional dispersant for being stable within a polymer composition. In embodiments, a self-dispersing pigment is a pigment that has been functionalized with a dispersing agent such as a molecule containing a hydrophilic functional group, for example, by covalent bonding of the molecule to the surface of the pigment.

In other embodiments, a pigment is combined with a dispersant such as a water-soluble polymer (e.g., vinyl polymer, urethane polymer). In embodiments, the pigment is a polymer-dispersed pigment comprising a polymer adsorbed thereto.

In embodiments, the amount (by weight) of the colorant in the inkjet ink compositions is at least 0.1, such as at least 0.5, at least 1, at least 1.5, and at least 2, % by weight. In embodiments, the amount of the colorant is at most 10, such as at most 9, at most 8, at most 7, at most 6, and at most 5, % by weight. This includes embodiments in which the amount of the colorant in the compositions is 0.1 to 10% by weight, such as 2 to 5% by weight.

A colorant used in the inventive inkjet ink compositions can comprise one or more embodiments described herein.

Fluid Carrier

The inkjet ink compositions comprise a fluid carrier which, in embodiments, comprises water and one or more organic co-solvents, which can be water-soluble organic co-solvents, water-miscible organic co-solvents, or a combination thereof. The organic co-solvents can be added either alone or in combination.

In embodiments, the organic co-solvents are humectants, which can reduce the rate of evaporation of the water component and prevent an ink composition from drying out or crusting in the nozzles of the printhead to minimize clogging of the nozzles. In embodiments, the organic co-solvents can enhance solubility of the components in the inkjet ink composition, and facilitate penetration of a printed ink composition into a substrate.

Suitable water-soluble and water-miscible organic solvents include, but are not limited to, alcohols (e.g., methanol, ethanol, propanol, isopropyl alcohol, butanol, polyols, ethylene glycol, glycerine, and PEG, among others), ketones and ketone alcohols (e.g., acetone and diacetone alcohol, among others), ethers (e.g., tetrahydrofuran, dioxane, and alkylethers, among others), ethers of polyhydric alcohols (e.g., ethylene glycol monomethyl ether, ethylene glycol monoethyl ether, ethylene glycol monoethyl ether acetate, di(ethyleneglycol) monomethyl ether, nitrogen-containing solvents (e.g., 2-pyrrolidone, and N-methyl-2-pyrrolidone, among others), sulfur-containing solvents (e.g., 2,2'-thiodiethanol, dimethylsulfoxide, tetramethylene sulfone, and sulfolane, among others), and sugars and derivatives thereof (e.g., glucose, oxyethylene adducts of glycerin, and oxyethylene adducts of diglycerin, among others).

In embodiments, the amount (by weight) of the organic co-solvent in the inkjet ink composition is at least 1, such as at least 5, and at least 10, % by weight. In embodiments, the amount (by weight) of the organic co-solvent is at most 80, such as at most 70, at most 60, and at most 50, % by weight. This includes embodiments in which the amount of the organic co-solvent in the composition is 1 to 80% by weight, such as 10 to 50% by weight.

An organic co-solvent used in the inventive inkjet ink compositions can comprise one or more embodiments described herein.

In embodiments, the amount (by weight) of water in the inkjet ink composition is at least 5, at least 8, at least 10, at least 15, at least 20, at least 25, and at least 30,% by weight. In embodiments the amount (by weight) of water is at most 95, at most 85, at most 80, at most 75, at most 70, at most 65, and at most 60, % by weight. This includes embodiments in which the amount of water in the composition is 5 to 95% by weight, such as 10 to 80, and 20 to 70, % by weight. The range of water in the composition is typically 15 to 75% by weight, and more typically 30 to 60% by weight.

Crosslinking Agent

As used herein, the terms "crosslinking agent" and "crosslinker" are used interchangeably.

In embodiments, the inkjet ink composition includes a crosslinking agent capable of reaction with a carboxyl group of the water-dispersible polyurethane polymer in the absence of a base (e.g., ammonia, tertiary amine, metal hydroxide), or with a hydroxyl group.

Suitable crosslinking agents capable of undergoing a reaction with a carboxyl group of the polyurethane polymer include, but are not limited to, carbodiimide reagents, water-dispersible polymers that contains a carbodiimide group, oxazoline reagents, water-dispersible polymers that contains an oxazoline group, methylated melamine-formaldehyde resins, and zirconium carbonate salts such as ammonium zirconium carbonate and potassium zirconium carbonate. Examples of commercially available crosslinking agents include, but are not limited to, Zirmel® (available from MEL Chemicals), Berset® (available from Bercen), Cymel® (available from Cytec), WorleeMin® (available from Worlee), Luwipal® (available from BASF), Zoldine® (available from Dow Chemical), Solucote® (from DSM NeoResins), Carbodilite™ (available from Nisshinbo Chemical Inc.), Resimene® & Maprenal® (available from INEOS), RODA Link® (from TFLUSA), Aerotex® (available from Union Ink), Epocros® (available from Nippon Shokubai Co., Ltd.), and Permutex® (available from Stahl USA Inc.).

Suitable crosslinking agents capable of undergoing a reaction with a hydroxyl group of the polyurethane polymer include, but are not limited to, water-dispersible blocked isocyanate compounds. Examples of commercially available blocked isocyanate compounds include, but are not limited to, Trixene® (available from Baxenden Chemicals Ltd), Vestanat® (available from Evonik Industries AG), Easaqua® (available from Perstorp Holding AB), and Ruco®-coat (available from Rudolf GmbH).

The inkjet ink compositions of the invention optionally include a crosslinking agent. In embodiments, the amount (by weight) of the crosslinking agent in the inkjet ink composition is zero. In other embodiments, the amount (by weight) of the crosslinking agent in the composition is >0, such as at least 0.05, at least 0.1, and at least 1.0, % by weight. In embodiments, the amount (by weight) of the crosslinking agent is at most 8, such as at most 7, at most 6, and at most 5, % by weight. This includes embodiments in which the amount of the organic co-solvent in the inkjet ink composition is 0 to 8% by weight, such as >0 to 8, 0.05 to 8, 1 to 7, 1.5 to 6, and 2 to 5, % by weight.

In some embodiments, the crosslinking reaction between a crosslinking agent and carboxyl group(s) of the water-dispersible polyurethane polymer can be facilitated by heat. For example, in some embodiments, the inkjet ink composition can be applied to a surface and then dried, whereupon the crosslinking agent and carboxyl group(s) undergo a crosslinking reaction. In embodiments, the crosslinking reaction can be facilitated by applying heat to the ink after the application or drying process.

Additives

In embodiments, the inkjet ink composition can optionally include one or more additives that are compatible with the other components of the composition. Additives can be included in the composition to impart any number of desired properties, including, but not limited to, stability, smear resistance, viscosity, surface tension, coating penetration, optical density, color depth, adhesion, highlighter resistance, and crust resistance, among others. Suitable additives for such uses and the amounts of such additives used are known and conventionally used in the art.

Examples of additives include, but are not limited to, defoamers, preservatives, surfactants, pH modifiers, viscosity modifiers, humectants, penetrating agents, and additional polymers, among others.

In embodiments, defoamers can be included in the inkjet ink composition to inhibit the formation of foam. Examples of suitable defoamers include, but are not limited to, silicone-based or non-silicone defoamers. Commercially available defoamers include, but are not limited to, Dow Corning® 71 and Dow Corning® 74 (from Dow Corning), TegoAirex® 901W, 902W, 904W from Evonik Industries/Tega, Tergitol® L-61, L-62, L-64 and L-101 (from Dow Chemical). A typical amount (by weight) of defoamer included in the composition is 0.1 to 3% by weight.

In embodiments, preservatives, such as biocides and fungicides, can be included in the inkjet ink composition to inhibit the growth of microorganisms. Examples of suitable preservatives include, but are not limited to, sodium benzoate, pentachlorophenol sodium, 2-pyridinethiol-1-oxide sodium, sodium sorbate, sodium dehydroacetate, benzisothiazolinone, 1,2-dibenzothiazolin-3-one, 1-(3-chlorallyl)-3,5,7-triaza-1 azoniaadamantane chloride (CTAC), methylisothiazolinone, and chloromethylisothiazolinone, among others. Commercially available biocides include UCAR-CIDE® 250 (available from Union Carbide Company), Proxel® CRL, Proxel® BDN, Proxel® GXL, Proxel® XL-2, Proxel® TN (available from Arch Chemicals, Smyrna, Ga.), Dowicil® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Pa.), Troysans® (Troy Chemical Corp., Newark, N.J.), and XBINX® (PMC Specialties Group, Inc., Cincinnati, Ohio). The preservatives may be used alone or in combination. A typical amount (by weight) of preservative included in the composition is 0.1 to 1.5% by weight.

In embodiments, surfactants can be included to reduce surface tension of the inkjet ink composition. The surfactant can be an anionic surfactant, non-ionic surfactant or cationic surfactant. Suitable surfactants can include, but are not limited to, those listed below and in U.S. Pat. Nos. 5,116,409, 5,861,447 and 6,849,111. Exemplary surfactants are commercially available under various trade names, such as the PLURONIC® series (BASF Corporation, Parsippany, N.J.), TETRONIC® series (BASF Corporation, Parsippany, N.J.), ARQUAD® series (Akzo Chemical Inc., Chicago, Ill.), TRITON® series (Union Carbide Corp., Danbury, Conn.), SURFONIC® series (Texaco Chemical Company, Houston, Tex.), ETHOQUAD® series (Akzo Chemical Inc., Chicago, Ill.), ARMEEN® series (Akzo Chemical Inc., Chicago, Ill.), ICONOL® series (BASF Corporation, Parsippany, N.J.), SURFYNOL® series (Air Products and Chemicals, Inc. Allentown, Pa.), and ETHOMEEN® series (Akzo Chemical Inc., Chicago, Ill.), among others. The surfactants can be used alone or in combination. A typical amount (by weight) of surfactant included in the composition is 0.1 to 10% by weight.

In embodiments, pH modifiers can be included to adjust or buffer the inkjet ink composition to a desired pH. Suitable pH modifiers include, but are not limited to, alkali hydroxides, alkali carbonates and bicarbonates, triethylamine, dimethylethanolamine, triethanolamine, mineral acids, hydrochloric acid, and sulfuric acid, among others. The pH modifiers can be used alone or in combination. A typical amount (by weight) of pH modifier in the composition is 0.1 to 2% by weight.

In embodiments, the inkjet ink composition can include one or more viscosity modifiers. Examples of suitable viscosity modifiers include, but are not limited to, resin compounds, alginic acid compounds, polyvinyl alcohol, hydroxypropyl cellulose, carboxymethyl cellulose, hydroxyethyl cellulose, methyl cellulose, salts of polyacrylic acid, polyvinyl pyrrolidone, gum arabic and starch, hydrophobic ethoxylated urethanes (HEURs), hydrophobically modified alkali swellable emulsions (HASEs), alkali swellable emulsions (ASEs), among others. The viscosity modifiers can be used alone or in combination. A typical amount (by weight) of viscosity modifier in the composition is 0.5 to 10% by weight.

In embodiments, in addition to an organic co-solvent of the fluid carrier component which can function as a humectant, one or more humectants can be included in the inkjet ink composition to reduce the rate of evaporation of the water component and prevent an ink composition from drying out in the nozzles of the printhead, which can occur during periods of latency, to minimize clogging of the nozzles. Humectants can be selected from materials having high hygroscopicity and water-solubility. Examples of suitable humectants include, but are not limited to, polyols (e.g., glycerol, ethylene glycol), alcohol ethers (e.g., diethylene glycol, triethylene glycol), lactams (e.g., 2-pyrrolidone, urea compounds such as urea, 1,3-dimethylimidazolidinone), saccharides (e.g., sorbitol), 1,4-cyclohexanedimethanol, 1-methyl-2-piperidone, N-ethylacetamide, 3-amino-1,2-propanediol, ethylene carbonate; butyrolacetone and Liponic EG-1, among others. There are no particular limitations on the amount used of the humectant. A typical amount (by weight) of humectant in the composition is 0.5 to 30% by weight.

In embodiments, penetrating agents can be included to reduce bleeding of an inkjet ink composition when applied to a print substrate such as paper, among others. Examples of suitable penetrating agents include, but are not limited to, alkyl alcohols having 1 to 4 carbon atoms (e.g., ethanol), glycol ethers (e.g., ethylene glycol monomethyl ether), diols (e.g., 1,2-alkyl diols), formamide, acetamide, dimethylsulfoxide, sorbitol and sulfolane, among others. The penetrating agents may be used alone or in combination. A typical amount (by weight) of penetrating agents in the composition is 1 to 20% by weight.

In embodiments, the inkjet ink composition can include additional polymers (other than the water-dispersible polyurethane polymer) to enhance water-fastness, rub and light fastness of an ink image applied to and dried on a print substrate. Examples of such polymers include, but are not limited to, polyvinyl alcohols, polyesters, polyestermelamines, styrene/acrylic acid copolymers, styrene/maleic acid copolymers, styrene/maleic acid/alkyl acrylate copolymers, styrene/methacrylic acid copolymers, styrene/methacrylic acid/alkyl acrylate copolymers, styrene/maleic half ester copolymers, vinyl naphthalene/acrylic acid copolymers, vinyl naphthalene/maleic acid copolymers, and salts thereof, among others. Such additional polymers can be used alone or in combination. A typical amount (by weight) of such additional polymers that can be included in the composition is 0.1 to 20% by weight.

In embodiments, the inkjet ink composition can include a self-crosslinking polymer to improve the durability of an ink image applied to and dried on a print substrate. Examples of such self-crosslinking polymers for use in the ink compositions include, but are not limited to, self-crosslinking polyurethane dispersions, acrylic polymers, styrene-acrylic copolymers, styrene-butadiene latexes, styrene-isoprene latexes, acrylonitrile-butadiene latexes, alkyd dispersions, vinyl polymers, silicone dispersions, polyamide dispersions, chlorinated olefin dispersions, and polyester dispersions, among other self-crosslinking polymers. Such self-crosslinking polymers can be used alone or in combination. A typical amount (by weight) of such self-crosslinking polymers that can be included in the composition is 0.1 to 20% by weight.

Other additives that can be included in the inkjet ink compositions include, but are not limited to, antioxidants, ultraviolet absorbers, chelating agents, electric conductivity adjusters, oxygen absorbers, anti-kogation agents, anti-curling agents, and fragrances, among others. The amounts of such additives for use in aqueous inkjet ink compositions are known and conventionally used in the art.

Preparation of the Inkjet Ink Compositions

The invention also provides methods of preparing the inkjet ink compositions disclosed herein. In embodiments, the inkjet ink compositions of the invention can be prepared by mixing a water-dispersible polyurethane polymer having pendant hydroxyl groups and optional pendant neutralized carboxyl groups, colorant(s), fluid carrier, optional crosslinking agent, and optional additives.

In embodiments, the inkjet ink composition can be prepared by mixing a water-dispersible polyurethane polymer having pendant hydroxyl groups and one or more pendant neutralized carboxyl groups, colorant(s), fluid carrier, an optional crosslinking agent, and optional additives.

In embodiments, the fluid carrier can be prepared by combining one or more water-soluble organic co-solvents, one or more water-miscible organic co-solvents or a mixture thereof, with water, which can be combined with the other components of the composition. In embodiments, the organic co-solvent(s) and water of the fluid carrier can be combined directly with the water-dispersible polyurethane polymer, colorant(s), optional crosslinking agent and optional additives.

In embodiments, the polyurethane polymer can be prepared by reaction of an isocyanate compound with a polyol, an ionic polyol, or a combination thereof, by methods known and used in the art. In embodiments, the polyurethane polymer can be prepared as a branched, hyperbranched, star, or dendritic polymer having pendant hydroxyl groups and optional pendant neutralized carboxyl groups, by methods known and used in the art.

In embodiments, carboxylic acid groups of the polyurethane polymer can be neutralized by dissolving the polyurethane polymer in an organic solvent and adding a neutralizing agent (e.g., ammonia, tertiary amine, alkali metal hydroxide) to react with the carboxylic acid groups and form carboxylate salts.

An ink composition according to the invention can comprise a combination of two or more embodiments described herein.

Methods of Printing

The invention further includes methods of printing an image on a substrate by applying an inkjet ink composition according to the invention onto the substrate. In embodiments, the inkjet ink compositions disclosed herein are adapted for use with an inkjet printing apparatus.

In an embodiment of a method of printing an image, droplets of an inkjet ink composition as disclosed herein are ejected from a small nozzle of a printhead and deposited onto a print substrate to generate an image thereon. Suitable inkjet ink printing apparatus can include, but are not limited to, Continuous Inkjet (CIJ), Drop-on-Demand Valve (DoD Valve), and Drop-on-Demand Piezo-Electric (DoD Piezo).

Examples of suitable print substrates include, but are not limited to, plain papers, bonded papers, coated papers, transparency materials, textile materials, metals, ceramics, glass, plastics, polymeric films and inorganic substrates, and woods, among others.

In embodiments, the inkjet ink compositions are formulated to have properties that allow for at least one of the following: 1) uniform, bleed-free print images with high resolution and high density on a print substrate; 2) inhibition or prevention of nozzle clogging which typically occurs due to drying of the ink at a distal end of a nozzle of the printing apparatus; 3) rapid drying on a print substrate (paper, fabric, film, etc.); 4) long-term storage stability; and 5) print characteristics that are independent of the print substrate quality. The inkjet ink compositions can also provide ink stability and robustness against fluctuating temperature conditions which can occur during transport and storage, to eliminate or inhibit nozzle clogging, banding, and poor print quality.

In embodiments, the inkjet ink compositions disclosed herein can be adapted specifically for use in textile printing processes. In embodiments, the inkjet ink compositions adapted for textile printing can be formulated to have at least one of the following properties: 1) fastness to textile fabrics such as cotton, silk, wool, nylon, polyester, polyamide, polyacrylonitrile, polyacrylic or blends of the same; and 2) ease of application and fixation to the textile fabric.

Inkjet Ink Cartridges

The invention further provides inkjet cartridges that are loaded (e.g., preloaded) with an inkjet ink composition as described herein. Inkjet ink cartridges are known and used in the art, and readily available commercially.

In embodiments, an inkjet cartridge can comprise a container, and the inkjet ink composition as disclosed herein contained in the container. In embodiments, an inkjet cartridge can comprise a housing with one or more chambers (internal reservoirs) containing an inkjet ink composition as disclosed herein, and a printhead having one or more small nozzles for ejecting the inkjet ink composition therethrough.

The inkjet ink composition is formulated to remain substantially stable for an extended period of time in sealed storage under ambient temperatures such that the properties of the ink composition do not change over the extended time period. For example, inkjet inks generally are stored in inkjet printer cartridges for extended periods, whereby the ambient atmosphere is substantially inhibited or prevented from coming into contact with the ink composition until it is ejected from the cartridge.

In embodiments, an inkjet ink composition comprising a water-dispersible polyurethane polymer having pendant hydroxyl groups and zero pendant carboxyl groups, with or without a crosslinking agent, the composition will remain stable for extended time periods in sealed storage under ambient temperatures, e.g., 5 to 50° C.

In embodiments, the inkjet ink composition is formulated with a water-dispersible polyurethane polymer having pendant hydroxyl groups and one or more pendant carboxyl groups reacted with a neutralizing agent such as ammonia or one or more tertiary amines that do not evaporate when under sealed storage but do evaporate when the ink composition comes into contact with the ambient atmosphere, whereupon the crosslinking agent and the carboxyl group undergo the crosslinking reaction. The neutralizing agent reacts with and neutralizes the carboxyl group(s) to carboxylate salt(s), thereby inhibiting a crosslinking reaction between the carboxyl group-containing polymer and the crosslinking agent, and thus stabilizing the inkjet ink composition during a storage period. The neutralizing agent is capable of disengaging from the carboxyl group under set conditions (e.g., exposure to ambient atmosphere) to allow the crosslinking reaction between the crosslinking agent and carboxyl group(s) to occur.

In another embodiment, an inkjet ink composition comprising a water-dispersible polyurethane polymer having pendant hydroxyl groups and one or more pendant carboxyl groups can be formulated to include one or more alkali metal hydroxides (to react with and neutralize the carboxyl groups), and a blocked isocyanate compound to inhibit the crosslinking reaction between the hydroxyl group-containing polymer and the isocyanate crosslinking agent during sealed storage, e.g., in an inkjet cartridge. The blocking agent is capable of disengaging from the blocked isocyanate compound under set conditions (e.g., upon heating) to allow the crosslinking reaction between the isocyanate crosslinking agent and hydroxyl groups to occur.

In embodiments, the inkjet ink composition remains stable such that at least one of the mean particle size and the viscosity of the composition does not substantially increase over a desired time period in sealed storage at ambient temperature. In embodiments, at least one of the mean particle size and the viscosity of the inkjet ink composition increases by less than 1%, 5%, 10%, 20%, 30%, 40%, 50%, or 100%, over a desired time period in sealed storage at ambient temperature. Such time period can be greater than one week, two weeks, three weeks, one month, two months, four months, six months, nine months, one year, or 1.5 years. This includes embodiments in which at least one of the mean particle size and the viscosity of the inkjet ink composition increases by less than 20% over three months in sealed storage at ambient temperature.

In embodiments, the stability of the inkjet ink composition under selected conditions can be assessed and/or determined via accelerated shelf life testing. Such testing can be conducted according to ASTM F2734, to determine the stability and performance of an inkjet ink composition when exposed to elevated temperatures in an inkjet cartridge. In embodiments, at least one of the mean particle size and the viscosity of the inkjet ink composition increases by less than 1%, 5%, 10%, less 20%, 30%, 40%, 50%, or 100%, over a desired time period in sealed storage at 60° C., such as over a time period of greater than 24 hours, 48 hours, one week, two weeks, three weeks, four weeks, five weeks, six weeks, seven weeks, eight weeks, two months, or three months. By example, in an embodiment, at least one of the mean particle size and the viscosity of the inkjet ink composition increases by less than 20% over a period of one week in sealed storage at 60° C.

Filling an Inkjet Ink Cartridge

The invention further provides methods of filling an inkjet cartridge with an inkjet ink composition as described herein.

In embodiments, ink cartridges can be formed with one or more ink chambers (internal reservoirs) into which an ink composition is introduced through a port or other opening in the housing of the cartridge using an ink syringe or conduit such as tubing.

In embodiments, an inkjet ink cartridge can be filled with the aqueous inkjet ink composition described herein by conducting the composition through a port or other opening in the housing of the cartridge to an internal reservoir within the housing, filling the internal reservoir with the composition, and sealing the port of the housing. In embodiments, the cartridge includes a printhead defining one or more nozzle orifices through which ink is ejected, with no other openings communicating between the internal reservoir containing the ink composition and the external environment (e.g., ambient atmosphere).

Definitions

Unless stated to the contrary, implicit from the context, or customary in the art, all parts and percents are based on weight, and all test methods are current as of the filing date of this disclosure. For purposes of United States patent practice, the contents of any referenced patent, patent application or publication are incorporated by reference, in their entirety (or its equivalent US version is so incorporated by reference), especially with respect to the disclosure of definitions (to the extent not inconsistent with any definitions specifically provided in this disclosure) and general knowledge in the art.

"Comprising", "including", "having" and like terms are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or," unless stated otherwise, refers to the listed members individually as well as in any combination.

It is understood that any numerical range recited herein includes all values from the lower value to the upper value. For example, if a concentration range is stated as 1 to 50% by weight, it is intended that values such as 2 to 40, 10 to 30, or 1 to 3, etc., % by weight, are expressly enumerated in this specification. These are only examples of what is specifically intended, and all possible combinations of numerical values between and including the lowest value and the highest value enumerated are to be considered to be expressly stated in this application.

EXAMPLES

Inkjet inks with compositions shown in Table I (values reported in gram) were prepared. In a typical procedure, 100 g of ink was prepared by mixing the ingredients shown in Table I under good agitation in a polyethylene bottle. The mixture was stirred for 2 hours, followed by filtration through a Titan 2 HPLC filter, 30 mm 0.7 micron GMF membrane (available from Sun Sri, Rockwood, Tenn.), and stored in a sealed bottle.

TABLE I

| Ink Label | Supplier | Black Ink | Cyan Ink | Magenta Ink | Yellow Ink |
|---|---|---|---|---|---|
| Sensijet ® Ultra-K dispersion | Sensient Technologies | 22.857 | | | |
| Sensijet ® Ultra-Cyan dispersion | Sensient Technologies | | 25.926 | | |
| Sensijet ® Ultra-Magenta dispersion | Sensient Technologies | | | 23.704 | |
| Sensijet ® Ultra-Yellow dispersion | Sensient Technologies | | | | 23.704 |
| Alberdingk ® DUR-95 PUD | Alberdingk Boley Inc. | 20.000 | 27.344 | 20.000 | 20.000 |
| Carbodilite ™ SV-02 | Nisshinbo Chemical Inc. | 2.208 | 3.018 | 2.207 | 2.207 |
| PuraGuard ® Propylene Glycol | Dow Chemical | 25.000 | 25.000 | 25.000 | 25.000 |
| Proglyde ® DMM | Dow Chemical | 5.000 | | | |
| OPTIM ™ Glycerine | Dow Chemical | | | 5.000 | 5.000 |
| Surfynol ® PSA-336 | Air Products & Chemicals Inc. | 1.000 | 1.000 | | |
| Tergitol ™ 15-S-7 | Dow Chemical | | | 1.000 | 1.000 |

TABLE I-continued

| Ink Label | Supplier | Black Ink | Cyan Ink | Magenta Ink | Yellow Ink |
|---|---|---|---|---|---|
| Kordek ® MLX | Dow Chemical | 0.100 | 0.100 | 0.100 | 0.100 |
| DI Water | | 23.835 | 17.612 | 22.989 | 22.989 |
| Total amount | | 100 | 100 | 100 | 100 |

The inks were allowed to incubate at 60° C. for selected periods of time in sealed storage containers. After time, the viscosity of the inks was measured at 23° C. As can be seen in Table II (values reported in cps), the inks are stable. The black, cyan, magenta, and yellow inks were fed to an ink supply line and printed through a Kyocera KJ4B printhead. All inks show good jetting.

TABLE II

| Ink Label | Viscosity (Initial) | Viscosity (7 days @ 60° C.) | Viscosity (14 days @ 60° C.) | Printing |
|---|---|---|---|---|
| Black Ink | 6.95 | 6.61 | 6.62 | Kyocera Printhead (KJ4B) |
| Cyan Ink | 7.39 | 6.75 | 7.31 | Kyocera Printhead (KJ4B) |
| Magenta Ink | 6.92 | 7.07 | 7.21 | Kyocera Printhead (KJ4B) |
| Yellow Ink | 6.78 | 6.47 | 6.72 | Kyocera Printhead (KJ4B) |

Although the invention is described herein with reference to specific embodiments, it will be appreciated by those of ordinary skill in the art that various modifications and changes can be made without departing from the scope of the present disclosure as set forth in the claims below. Accordingly, the specification is to be regarded in an illustrative rather than a restrictive sense, and all such modifications are intended to be included within the scope of the present disclosure. Any benefits, advantages, or solutions to problems that are described herein with regard to specific embodiments are not intended to be construed as a critical, required or essential feature or element of any or all of the claims. For the purposes of United States patent practice, the contents of any referenced patent, patent application or publication are incorporated by reference in their entirety.

The invention claimed is:

1. An aqueous inkjet ink composition, comprising:
    A. A water-dispersible polyurethane polymer having a backbone with pendant hydroxyl groups and, optionally, pendant neutralized carboxyl groups;
    B. A colorant;
    C. A fluid carrier; and
    D. Optionally, a crosslinker;
wherein the polyurethane polymer has a carboxyl number of 10-100 and a hydroxyl number of 80-200;
wherein the polyurethane polymer has a glass transition temperature ($T_g$) of at least 0° C. to 50° C.;
wherein the polyurethane polymer has a number average molecular weight (Mn) of 1,000 to 1,000,000;
wherein the fluid carrier comprises:
    a) water; and
    b) one or more water-soluble organic co-solvents, water-miscible organic co-solvents, or a combination thereof;
wherein the water-dispersible polyurethane polymer has a backbone with pendant hydroxyl groups and pendant neutralized carboxyl groups, and the neutralized carboxyl groups are in the form of a salt selected from the group consisting of a ammonium carboxylate salt, a tertiary amine carboxylate salt, and combinations thereof;
wherein the polyurethane polymer comprises the reaction product of an isocyanate compound with a polyol, an ionic polyol, or a combination thereof; and
wherein at least one of a mean particle size and viscosity of the composition increases by less than 20% over a two-week period in a sealed storage at 60° C., as determined by an accelerated shelf life test.

2. The composition of claim 1, wherein the polyurethane polymer has a structure selected from the group consisting of branched, hyper-branched, star, and dendritic, and combinations thereof.

3. The composition of claim 2, wherein the polyurethane polymer has a number average molecular weight (Mn) of 2,000 to 50,000.

4. The composition of claim 1, comprising:
    0.1-20% by weight polyurethane polymer;
    0.1-10% by weight colorant;
    1-80% by weight water-soluble organic solvents;
    0-8% by weight crosslinker; and
    the balance being water;
    wherein the % by weight is based on the total weight of the composition.

5. The composition of claim 4, comprising:
    3-10% by weight polyurethane polymer;
    2-5% by weight colorant;
    10-50% by weight water-soluble organic solvents;
    0-5% by weight crosslinker; and
    10-80% by weight water;
    wherein the % by weight is based on the total weight of the composition.

6. The composition of claim 5, wherein the water-dispersible polyurethane polymer has a backbone with pendant hydroxyl groups and pendant neutralized carboxyl groups, and the neutralized carboxyl groups are in the form of a sodium carboxylate salt, lithium carboxylate salt, potassium carboxylate salt, or combination thereof.

7. The composition of claim 6, wherein the polyol is selected from the group consisting of diols, triols, tetraols, pentaols, and oligomers having pendant or terminal hydroxyl groups, and combinations thereof.

8. The composition of claim 7, wherein the ionic polyol is selected from the group consisting of dimethylolpropionic acid, 2,2-di(hydroxymethyl)acetic acid, 2,2-bis(hydroxymethyl)butyric acid, 2,2-di(hydroxymethyl)pentanoic acid, diols, triols, tetraols and pentaols with one or more carboxyl groups, and an oligomer having hydroxyl and carboxyl groups, and combinations thereof.

9. The composition of claim 1, wherein the colorant is selected from the group consisting of a dye, pigment dispersion, or combination thereof.

10. The composition of claim 1, wherein the crosslinker is selected from the group consisting of water-dispersible blocked isocyanate compounds, water-dispersible polymer containing an oxazoline group, oxazoline reagents, water-dispersible polymer containing a carbodiimide group, carbodiimide reagents; methylated melamine-formaldehyde resins, and zirconium carbonate salts, and combinations thereof.

11. The composition of claim 1, further comprising one or more additives selected from the group consisting of preservatives, surfactants, pH modifiers, viscosity modifiers, humectants, penetrating agents, and additional polymers.

12. The composition of claim 1, further comprising one or more additives selected from the group consisting of antioxidants, ultraviolet absorbers, chelating agents, electric conductivity adjusters, oxygen absorbers, anti-kogation agents, anti-curling agents, and fragrances.

13. A method of preparing the composition of claim 1, comprising:
mixing together the water-dispersible polyurethane polymer, colorant and fluid carrier to form the inkjet ink composition.

14. The method of claim 13, further comprising mixing the water-dispersible polyurethane polymer, colorant and fluid carrier with a crosslinking agent.

15. The method of claim 13, further comprising mixing the water-dispersible polyurethane polymer, colorant and fluid carrier with crosslinker with one or more additives.

16. The method of claim 13, further comprising preparing the water-dispersible polyurethane polymer as a branched, hyper-branched, star, or dendritic polymer.

17. The method of claim 13, further comprising forming the water-dispersible polyurethane polymer having a backbone with pendant hydroxyl groups and pendant neutralized carboxyl groups.

18. The method of claim 17, wherein forming the water-dispersible polyurethane polymer comprises reacting the water-dispersible polyurethane polymer having a backbone with pendant hydroxyl groups and pendant unneutralized carboxyl groups with a neutralizing agent selected from the group consisting of ammonia, tertiary amines, alkali metal hydroxides and combinations thereof, to form the carboxylic acid groups into carboxylate salts.

19. An inkjet ink cartridge comprising a container, and the composition of claim 1 contained in the container.

20. A method of filling an inkjet ink cartridge, comprising:
conducting the composition of claim 1 through an opening of a housing of the cartridge to an internal reservoir within the housing;
filling the internal reservoir with the composition; and
sealing the opening of the housing.

21. A method of printing on a print substrate, comprising using an inkjet print-head to deposit the inkjet ink composition of claim 1 on the print substrate to form an image thereon.

22. The method of claim 21, further comprising drying the composition on the substrate by applying heat.

23. The method of claim 21, wherein the print substrate is selected from the group consisting of plastic, glass, metal, paper and textiles.

* * * * *